United States Patent
Shinohara et al.

(10) Patent No.: US 11,110,629 B2
(45) Date of Patent: Sep. 7, 2021

(54) METHOD FOR PRODUCING RESIN PELLETS

(71) Applicant: Mitsubishi Gas Chemical Company, Inc., Tokyo (JP)

(72) Inventors: Katsumi Shinohara, Niigata (JP); Tsutomu Nitanda, Niigata (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 0 days.

(21) Appl. No.: 16/603,776

(22) PCT Filed: May 15, 2018

(86) PCT No.: PCT/JP2018/018715
§ 371 (c)(1),
(2) Date: Oct. 8, 2019

(87) PCT Pub. No.: WO2018/216550
PCT Pub. Date: Nov. 29, 2018

(65) Prior Publication Data
US 2020/0406504 A1  Dec. 31, 2020

(30) Foreign Application Priority Data
May 26, 2017 (JP) .............................. JP2017-104937

(51) Int. Cl.
*B29B 9/06* (2006.01)
*B29C 48/345* (2019.01)
(Continued)

(52) U.S. Cl.
CPC ................ *B29B 9/06* (2013.01); *B29C 48/05* (2019.02); *B29C 48/345* (2019.02); *C08G 69/26* (2013.01); *C08J 3/12* (2013.01); *C08J 2377/06* (2013.01)

(58) Field of Classification Search
CPC ......... B29B 9/06; B29B 9/065; B29C 48/345; B29C 48/05
See application file for complete search history.

(56) References Cited

U.S. PATENT DOCUMENTS 4,101,613 A * 7/1978 Norwood ................. D01D 1/00
264/40.3
5,439,623 A * 8/1995 Fintel ...................... B29C 48/05
264/40.1
(Continued)

FOREIGN PATENT DOCUMENTS

EP 1555102 A1 7/2005
JP H08-290454 A 11/1996
(Continued)

OTHER PUBLICATIONS

International Search Report for PCT/JP2018/018715, dated Aug. 21, 2018, and English Translation submitted herewith (4 pages).

*Primary Examiner* — Seyed Masoud Melekzadeh
(74) *Attorney, Agent, or Firm* — Fitch, Even, Tabin & Flannery LLP (57) ABSTRACT

An object of the present invention is to provide a method for producing resin pellets, in which occurrence of defective pellets is suppressed. The method for producing resin pellets of the present invention includes the following steps, and a strand-shaped resin has a diameter of 1.5 to 4.5 mm, is discharged at a take-off speed of 1.5 m/s to 10 m/s, a die has 10 or more die holes, and a strand interval X defined by Formula 2 satisfies the following Formula 1; step 1: discharging a molten thermoplastic resin through a die in the (Continued)

form of a strand; step 2: cooling the discharged strand-shaped resin using a refrigerant; and step 3: cutting the cooled strand-shaped resin to obtain resin pellets;

$$1.73 \times a \leq X^b \leq 2.81 \times a \quad \text{Formula 1}$$

$a=0.524$, $b=0.367$ $$X(\text{cm}) = \{(\text{effective die plate width})(\text{cm}) - (\text{strand diameter})(\text{cm}) \times (\text{number of strands}-1)\} / \{(\text{number of strands})-1\} \quad \text{Formula 2}$$

wherein the effective die plate width: maximum distance between the outside hole center of a die hole and the outside hole center of a die hole each at the ends of the die.

10 Claims, 2 Drawing Sheets

(51) Int. Cl.
 *B29C 48/05* (2019.01)
 *C08G 69/26* (2006.01)
 *C08J 3/12* (2006.01)

(56) References Cited

U.S. PATENT DOCUMENTS

| | | |
|---|---|---|
| 2003/0216538 A1 | 11/2003 | Kawano et al. |
| 2005/0153134 A1* | 7/2005 | Sasaki ............ C08J 9/18 |
| | | 428/402 |
| 2006/0108703 A1* | 5/2006 | Uchiumi ............ B29B 9/065 |
| | | 264/85 |
| 2008/0051494 A1* | 2/2008 | Savich ............ B29C 48/832 |
| | | 524/47 |
| 2008/0067708 A1* | 3/2008 | Matsuoka ............ B29C 48/13 |
| | | 264/40.6 |
| 2008/0237906 A1* | 10/2008 | Yoshida ............ B29B 9/06 |
| | | 264/5 |
| 2009/0295016 A1 | 12/2009 | Shinohara et al. |
| 2010/0136338 A1* | 6/2010 | Hirai ............ B29B 9/065 |
| | | 428/402 |
| 2011/0274923 A1* | 11/2011 | Hartmann ............ B29C 48/92 |
| | | 428/364 |
| 2012/0201917 A1 | 8/2012 | Shinohara et al. |
| 2013/0065053 A1* | 3/2013 | Kikuchi ............ B29C 48/345 |
| | | 428/402 |
| 2017/0157831 A1* | 6/2017 | Mandel ............ B33Y 30/00 |

FOREIGN PATENT DOCUMENTS

| | | |
|---|---|---|
| JP | H11-012364 A | 1/1999 |
| JP | 2001-205627 A | 7/2001 |
| JP | 2003-136528 A | 5/2003 |
| JP | 2004-188613 A | 7/2004 |
| JP | 2005-205734 A | 8/2005 |
| JP | 2008-127872 A | 6/2008 |
| JP | 2008-238791 A | 10/2008 |
| JP | 2010-179627 A | 8/2010 |
| JP | 2011-230419 A | 11/2011 |
| JP | 2011-232705 A | 11/2011 |
| JP | 2012-012439 A | 1/2012 |
| JP | 2013-173872 A | 9/2013 |
| JP | 2014-001257 A | 1/2014 |
| JP | 2016-079203 A | 5/2016 |
| JP | 2017-075271 A | 4/2017 |
| KR | 10-2009-0124967 A | 12/2009 |

* cited by examiner

METHOD FOR PRODUCING RESIN PELLETS

CROSS-REFERENCE TO RELATED APPLICATIONS

This application is a U.S. national phase application filed under 35 U.S.C. § 371 of International Application Number PCT/JP2018/018715, filed May 15, 2018, designating the United States, which claims priority from Japanese Application Number 2017-104937, filed May 26, 2017.

FIELD OF THE INVENTION

The present invention relates to a method for producing resin pellets.

BACKGROUND OF THE INVENTION

Thermoplastic resins are used as injection formed materials such as home electric appliances, various automobile components and housings of computers, clothing such as filament yarn and knit fabric, industrial or leisure filament materials such as tire cord, fishing net and fish line, food packaging films, sheet for various containers or materials for bottles. Thermoplastic resins have chemical and mechanical properties such as high strength, wear resistance, fatigue resistance, good dyeability and gas barrier properties depending on their type.

Usually, a thermoplastic resin prepared by batchwise polymerization is extruded in the form of filament called a strand, through a plurality of discharge ports by increasing pressure in a polymerization vessel using inert gas or, in the case of continuous type, by mechanical power such as a gear pump or a screw; and then the strand is cooled, solidified and cut in a pelletizer to give a product in the form of pellets, or the product is used as a starting material for solid phase polymerization. This step is generally called a pelletization step.

Methods of pelletization of a thermoplastic resin include several methods, and due to its relatively low cost, simple mechanism, easy maintenance, and a stable shape of pellets, a typical method is to cool and solidify molten strands by refrigerant and then cut them with a cutter and the like to form pellets. In this method, if a strand is pelletized while in contact with or being adhered to the adjacent strand, double pellets and multiple pellets in which a plurality of pellets are adhered are formed. Furthermore, if bubbles are formed during discharge due to, for example, insufficient cooling, deformed pellets may be produced. Such double pellets, multiple pellets and deformed pellets cause poor feeding, or malfunction of an injection molding machine or an extruder at the time of injection molding or extrusion. Thus, those pellets are usually sorted with a sorting machine such as a sieve and removed to the outside of the process.

Patent Literature 1 discloses a spinneret for forming polyamide having a specific shape with the purpose of suppressing occurrence of deformed pellets.

CITATION LIST

Patent Literature

PTL1: JP 08-290454 A

SUMMARY OF INVENTION

The spinneret for forming polyamide disclosed in Patent Literature 1 has a shape suited to a specific resin, and thus the problem is that its range of application is limited and the spinneret for forming must be exchanged when a different resin is produced in the same reaction vessel.

Occurrence of defective pellets such as double pellets, multiple pellets and deformed pellets in the pelletization step has resulted in the problem of a reduction in the yield of thermoplastic resin pellets.

An object of the present invention is to provide a method for producing resin pellets, in which occurrence of double pellets and other defective pellets such as multiple pellets and deformed pellets is suppressed.

The present inventors have conducted intensive studies in view of the above problems, and as a result have found that occurrence of defective pellets such as double pellets, multiple pellets and deformed pellets is suppressed by setting the diameter of a strand-shaped resin to be discharged and the take-off speed at a specific range respectively and by setting the interval between strands to the range that satisfies a specific formula, and the present inventors have completed the present invention. The present invention provides the following [1] to [10].

[1] A method for producing resin pellets, comprising the following step 1 to step 3:

step 1: discharging a molten thermoplastic resin through a die in the form of a strand to obtain a discharged strand-shaped resin;

step 2: cooling the discharged strand-shaped resin using a refrigerant to obtain a cooled strand-shaped resin; and step 3: cutting the cooled strand-shaped resin to obtain resin pellets, wherein the strand-shaped resin has a diameter of 1.5 to 4.5 mm, the molten thermoplastic resin is discharged in the form of a strand at a take-off speed of 1.5 m/s to 10 m/s, the die has 10 or more die holes, and a strand interval X defined by the following Formula 2 satisfies the following Formula 1:

$$1.73 \times a \leq X^b \leq 2.81 \times a \qquad \text{Formula 1}$$

wherein a, b and X are as defined below:

a=0.524 b=0.367

$$X(\text{cm}) = \{(\text{effective die plate width})(\text{cm}) - (\text{strand diameter})(\text{cm}) \times (\text{number of strands} - 1)\} / \{(\text{number of strands}) - 1\} \qquad \text{Formula 2}$$

wherein the effective die plate width is a maximum distance between the outerside hole center of a die hole and the outerside hole center of a die hole each at the ends of the die.

[2] The method for producing resin pellets according to [1], wherein the thermoplastic resin is a polyamide resin.

[3] The method for producing resin pellets according to [1] or [2], wherein the die hole has a hole diameter of 0.2 to 1.5 cm.

[4] The method for producing resin pellets according to any one of [1] to [3], wherein the thermoplastic resin has a melt viscosity of 50 to 3,000 Pa·s under a condition of a shear rate of 122 $\sec^{-1}$ at a temperature of the resin during a discharge in the step 1.

[5] The method for producing resin pellets according to any one of [1] to [4], wherein the step 2 is performed by a slider cooling system.

[6] The method for producing resin pellets according to any one of [1] to [5], wherein the temperature of the refrigerant is 10 to 70° C. in the step 2.

[7] The method for producing resin pellets according to any one of [1] to [6], wherein the refrigerant in the step 2 is water.

[8] The method for producing resin pellets according to any one of [1] to [7], wherein the contact time of the strand-shaped resin with the refrigerant is 0.1 to 6.7 seconds.

[9] The method for producing resin pellets according to any one of [1] to [8], wherein the thermoplastic resin is a polyamide resin obtained by melt polymerization of a dicarboxylic acid component comprising 30% by mole or more of α,ω-aliphatic dicarboxylic acid having 4 to 20 carbon atoms and a diamine component comprising 70% by mole or more of xylylenediamine and bis(aminomethyl)cyclohexane in total.

[10] The method for producing resin pellets according to any one of [1] to [9], wherein the step 1 is a step of discharging the thermoplastic resin from a reaction vessel under pressure and the pressure is 0.1 to 1 MPaG.

The present invention can provide a method for producing resin pellets, in which occurrence of double pellets and other defective pellets such as multiple pellets and deformed pellets is suppressed.

DESCRIPTION OF EMBODIMENTS

Hereinafter, the present invention will be described with reference to embodiments. In the following description, the numerical range "A to B" represents "A or more and B or less" (if A<B), or "A or less and B or more" (if A>B). In other words, "A to B" represents a numerical range inclusive of end points A and B.

Furthermore, parts by mass and % by mass have the same meaning as parts by weight and % by weight, respectively.

The method for producing resin pellets of the present invention comprises the following step 1 to step 3.

Step 1: discharging a molten thermoplastic resin through a die in the form of a strand to obtain a discharged strand-shaped resin;

Step 2: cooling the discharged strand-shaped resin using a refrigerant to obtain a cooled strand-shaped resin; and Step 3: cutting the cooled strand-shaped resin to obtain resin pellets, Furthermore, the strand-shaped resin has a diameter (hereinafter, also referred to as a "strand diameter") of 1.5 to 4.5 mm, the resin is discharged in the form of a strand at a take-off speed of 1.5 m/s to 10 m/s, the die has 10 or more die holes, and a strand interval X defined by the following Formula 2 satisfies the following Formula 1:

$$1.73 \times a \leq X^b \leq 2.81 \times a \quad \text{Formula 1}$$

wherein a, b and X are as defined below:
a=0.524
b=0.367

$$X(\text{cm}) = \{(\text{effective die plate width})(\text{cm}) - (\text{strand diameter})(\text{cm}) \times (\text{number of strands}-1)\} / \{(\text{number of strands})-1\} \quad \text{Formula 2}$$

The effective die plate width is the maximum distance between the outside hole center of a die hole and the outside hole center of a die hole each at the ends of the die.

The method for producing resin pellets of the present invention satisfies the above requirements, whereby occurrence of defective pellets such as double pellets, multiple pellets and deformed pellets is suppressed. In the present invention, a resin pellet produced by contact or adherence of two strands is called a double pellet and a resin pellet produced by contact or adherence of three or more strands is called a multiple pellet. Furthermore, total defective resin pellets, including double pellets and multiple pellets, are collectively called defective pellets. Defective pellets excluding double pellets from total defective pellets are referred to as other defective pellets. Thus, defective pellets include double pellets and other defective pellets.

Occurrence of double pellets and multiple pellets caused by adhesion of strands and occurrence of deformed pellets caused by poor cooling are assumed to be suppressed by suppressing adhesion of strands by increasing the interval between strands and increasing the amount of refrigerant relative to the amount of strands. However, the disadvantage is that an increased strand interval causes a reduction in production efficiency.

Then, the present inventors conducted intensive studies to achieve a method for producing resin pellets with excellent productivity while suppressing occurrence of defective pellets, with a specific strand diameter and a specific take-off speed, and as a result have found that adhesion of strands occurs due to swaying of strands during cooling, and when a strand interval X is employed, the strand interval X satisfies a specific formula well, and its probability exhibits a behavior close to a normal distribution, and the present inventors have completed the present invention.

The present inventors have found that for the occurrence of defective pellets, double pellets, in particular, occurs frequently, and thus suppression of occurrence of double pellets leads to suppression of occurrence of other defective pellets including multiple pellets.

Hereinafter, the present invention will be described with reference to drawings. In the following description, the same symbol represents the same object.

Figure 1:
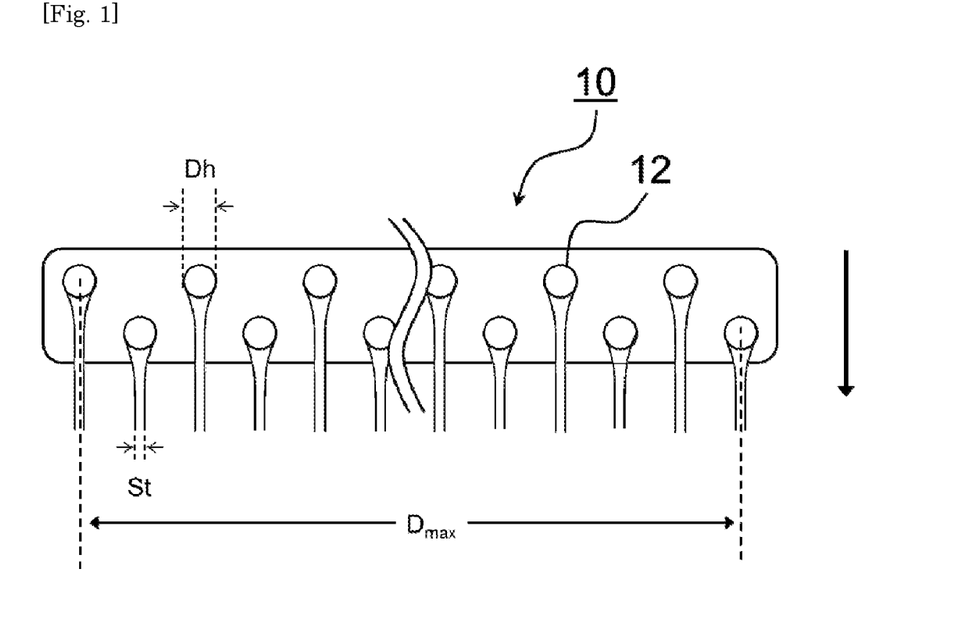
FIG. 1 shows a plan schematic view illustrating an example of a discharge of strands through a die plate.

FIG. 1 shows a plan schematic view illustrating an example of a discharge of strands through a die plate used in the present invention. Referring to FIG. 1, the die plate is observed from the side where a resin is discharged, i.e., from the outside of a reaction vessel. The flow direction of strands is shown by an arrow.

A die hole 12 is formed on a die plate 10. The number of die holes is 10 or more in total. The number of die holes 12 depends on the size of the reaction vessel to be used and is preferably 20 or more, more preferably 32 or more, and further preferably 42 or more, and preferably 120 or less, more preferably 108 or less, and further preferably 98 or less.

In the present invention, a strand interval X (cm) is defined by the following Formula 2.

$$X(\text{cm}) = \{(\text{effective die plate width})(\text{cm}) - (\text{strand diameter})(\text{cm}) \times (\text{number of strands}-1)\} / \{(\text{number of strands})-1\} \quad \text{Formula 2}$$

In this regard, the effective die plate width is the maximum distance between the outside hole center of one die hole and the outside hole center of another die hole each at the ends of the die. In FIG. 1, the effective die plate width is represented by $D_{max}$. The effective die plate width is the maximum distance between strands from the outside hole center of a die hole to the outside hole center of a die hole at either end. When step 2 described later is performed by a slider cooling system, the effective die plate width is the distance between strands on a slider from the outerside hole center of a die hole to the outerside hole center of a die hole at either end. In FIG. 1, the strand diameter is represented by St.

Figure 2:
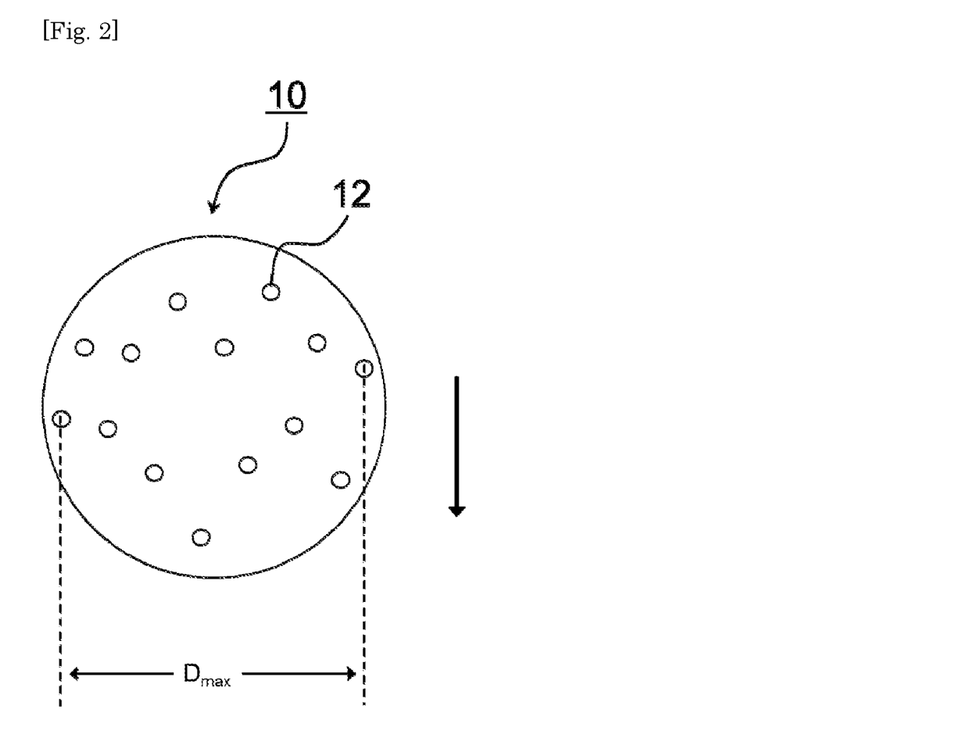
FIG. 2 shows a plan view illustrating another example of a die plate.

When a circular die is used as shown in FIG. 2, the effective die plate width, which is represented by $D_{max}$, is a distance between the outerside hole center of a die hole and the outerside hole center of a die hole each at the ends of the die in the direction perpendicular to the discharging direction of a strand, or, in the case of a slider cooling system, the direction perpendicular to the flow direction (slider direction) of refrigerant.

In the present invention, the strand-shaped resin discharged in step 1 has a diameter (strand diameter, St in FIG. 1) of 1.5 to 4.5 mm. When the strand diameter is less than 1.5 mm, the speed per unit time of discharging a molten thermoplastic resin from the reaction vessel is reduced, leading to a reduction in the productivity of resin pellets. Furthermore, when the strand diameter is more than 4.5 mm, cooling of strands by refrigerant may be insufficient.

The strand diameter is preferably 1.8 mm or more, more preferably 2 mm or more and further preferably 2.2 mm or more, and preferably 4.2 mm or less, more preferably 3.8 mm or less and further preferably 3.5 mm or less.

The strand diameter (St (cm)) is represented by the following Formula 3 using the flow rate of polymer per die hole (B (cm$^3$/s)) and the take-off speed (C (cm/s)).

$$St = 2 \times \{(B/C) \div \pi\}^{0.5} \quad \text{Formula 3}$$

In step 1, the take-off speed in a discharge in the form of a strand is 1.5 m/s to 10 m/s. When the take-off speed is less than 1.5 m/s, the speed per unit time of discharging a molten thermoplastic resin from the reaction vessel is reduced, leading to a reduction in the productivity of resin pellets. Furthermore, when the take-off speed is more than 10 m/s, cooling of strands by refrigerant may be insufficient.

The take-off speed is preferably 1.8 m/s or more, more preferably 2.1 m/s or more and further preferably 2.3 m/s or more, and preferably 7 m/s or less, more preferably 5 m/s or less, further preferably 4.4 m/s or less, still more preferably 4.0 m/s or less, and yet more preferably 3.8 m/s or less.

In the present invention, the take-off speed (m/s) means a take-off speed of strands immediately before cutting in step 3, and is substantially approximated by the rotational speed of a take-off roll for introduction, which introduces strands into a cutter for cutting.

The present inventors have focused on the fact that a double strand is formed because a strand in a discharge is swayed in a refrigerant and thus is brought into contact with and is adhered to an adjacent strand. Then the present inventors have conducted studies assuming that a strand interval X and the probability of double pellets show a correlation close to a normal distribution. However, no sufficient correlation resembling a normal distribution was obtained with only a strand interval X.

Then, the present inventors conducted intensive studies and as a result have found that the $b^{th}$ power of a strand interval X and the probability of double pellets correspond well with a normal distribution, and when a specific value (a) is adopted as a standard deviation, the probability of double pellets calculated corresponds well with an actual probability of double pellets.

With the assumption that suppression of occurrence of double pellets to less than 8.5% leads to suppression of occurrence of total defective pellets to 10% or less, 1.73×a (standard deviation), at which the area outside the normal distribution is less than 8.5%, has been selected as the lower limit of $X^b$.

It has also been thought that the larger strand interval X, the more the probability of double pellets is reduced, but although occurrence of double pellets of less than 0.5% leads to a good yield, the productivity of resin pellets is reduced and economical effects are small. Thus, 2.81×a (standard deviation), at which the area outside the normal distribution is 0.5% or more, has been selected as the upper limit of $X^b$.

Accordingly, $X^b$ needs to satisfy the following Formula 1.

$$1.73 \times a \leq X^b \leq 2.81 \times a \quad \text{Formula 1}$$

It has been found that when a=0.524 and b=0.367 are adopted for a and b in Formula 1, respectively, the probability of double pellets actually measured corresponds well with the probability of double pellets calculated by Formula 1.

It is determined from Formula 1 above that to adjust the occurrence of double pellets to 0.5% or more and 5% or less, X is selected such that $(1.96 \times a \leq X^b \leq 2.81 \times a)$ is satisfied.

It is determined from Formula 1 above that to adjust the occurrence of double pellets to 1% or more and 5% or less, X is selected such that $(1.96 \times a \leq X^b \leq 2.58 \times a)$ is satisfied.

In the present invention, the hole diameter of a die hole (Dh in FIG. 1 and FIG. 3) is preferably 0.2 to 1.5 cm (2 to 15 mm). The hole diameter of a die hole may be selected in relation to the take-off speed such that a suitable strand diameter is achieved. The above range is preferred in consideration of, for example, easiness of a discharge.

Figure 3:
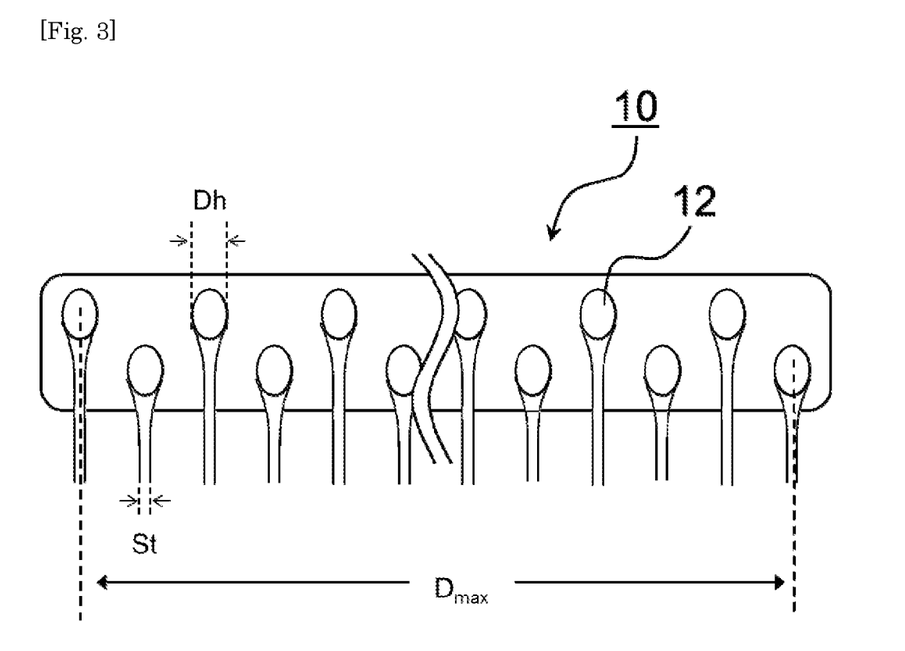
FIG. 3 shows a plan schematic view illustrating another example of a discharge of strands through a die plate.

The hole diameter of a die hole means the diameter of a die hole when the die hole is circular. If the die hole is not circular as shown in FIG. 3, the hole diameter means the maximum diameter in the direction perpendicular to the direction of a discharge of strands. Furthermore, the hole diameter of a die hole means a hole diameter at the outlet for strands.

The hole diameter of a die hole is more preferably 0.42 cm or more, and further preferably 0.62 cm or more, and more preferably 1.18 cm or less, and further preferably 0.98 cm or less.

The hole diameter of a plurality of die holes is not necessarily the same all over the die. For example, in a coat hanger die in which discharge pressure is easily applied, die holes may be small in the central portion of the die while die holes may, for example, be large in portions near both ends of the die where discharge pressure is not easily applied.

Examples of hole shapes of a die hole include a circle, an ellipse, a polygon, a star, or a shape of part of them (e.g., a semi-circle, a semi-ellipse) and a shape in which they are combined (a rectangle with a semi-circle on both ends). Among them, the shape of a die hole is preferably a circle or an ellipse, and more preferably a circle.

Figure 4:
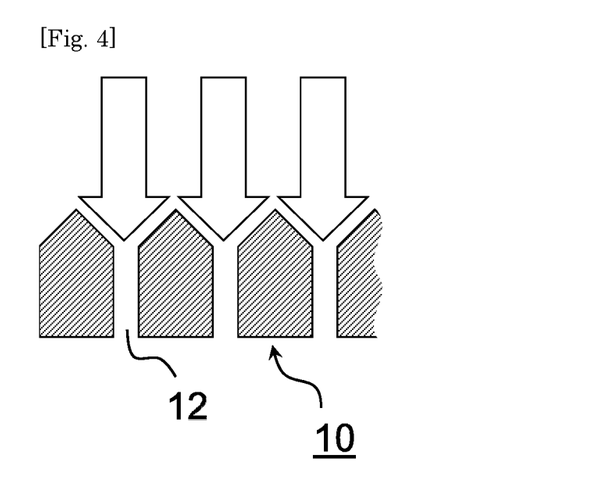
FIG. 4 shows a cross-sectional view of an example of a die plate in the flow direction of a resin.

Furthermore, the shape of a die hole extending from the inlet (on the side of the inside of a reaction vessel) to the outlet for a resin is not particularly limited as long as it is a known shape. FIG. 4 shows a cross-sectional view of a preferred die plate 10 in the flow direction of a resin. It is preferable that as shown in FIG. 4, the hole diameter of a die hole 12 of the die plate 10 be larger on the side of an inlet and be gradually reduced, and on the side of an outlet, its shape be the same as that of the die hole for a certain distance near the outlet, from the viewpoint of suppressing retention of a resin. In FIG. 4, arrows show the flow of a resin.

In the present invention, it is preferable that the thermoplastic resin have a melt viscosity of 50 to 3,000 Pa·s under a condition of a shear rate of 122 $sec^{-1}$ at a temperature of the resin during a discharge in step 1.

It is preferable that the thermoplastic resin have a melt viscosity of 50 Pa·s or more under a condition of a shear rate of 122 $sec^{-1}$ at a temperature of the resin during a discharge, because a molten resin is not excessively soft, thus conditions of strands are kept, break is suppressed and strands having a constant diameter are likely to be prepared. Furthermore, a melt viscosity of 3,000 Pa·s or less is preferred, because a molten thermoplastic resin can be discharged in the form of a strand through a die and can be discharged without excessive pressure.

The above melt viscosity is more preferably 90 Pa·s or more, and further preferably 160 Pa·s or more, and more preferably 1,800 Pa·s or less, and further preferably 780 Pa·s or more.

The above melt viscosity is measured by the method described in Examples.

[Step 1 to Step 3]

The method for producing resin pellets of the present invention comprises the above step 1 to step 3. Hereinafter, the respective steps will be described.

[Step 1]

Step 1 is a step of discharging a molten thermoplastic resin through a die in the form of a strand. It is preferable that step 1 be a step of discharging a molten thermoplastic resin in the form of a strand through a die from a reaction vessel in which polymerization of the thermoplastic resin has been performed.

A preferred method for discharging a molten thermoplastic resin in the form of a strand through a die is to introduce a molten thermoplastic resin into a die through, for example, an extruder, a gear pump or a tube connected to a reaction vessel for melt polymerization which has been pressurized, and then discharge the resin through die holes formed at the end of the die in the form of a strand.

It is preferable that step 1 be a step of discharging a thermoplastic resin from a reaction vessel (preferably a reaction vessel for polymerization) under pressure. It is preferable that the pressure be 0.1 to 1 MPaG. The present invention suppresses occurrence of defective pellets and has excellent productivity of resin pellets even when the pressure of extrusion from the reaction vessel is small and swaying of strands during cooling is large.

The above pressure is more preferably 0.2 to 0.8 MPaG, and further preferably 0.25 to 0.55 MPaG.

[Step 2]

Step 2 is a step of cooling the discharged strand-shaped resin using a refrigerant.

In step 2, a strand-shaped thermoplastic resin is brought into contact with a refrigerant and introduced into a cutter (pelletizer) together with the refrigerant.

The refrigerant used in step 2 is not particularly limited as long as it is a liquid fluid, is capable of cooling the strand-shaped resin, and does not dissolve or deteriorate the strand. Water is particularly preferred from the viewpoint of easy handling and the cost.

The temperature of the refrigerant is not particularly limited, and when water is used as the refrigerant, the temperature is preferably 10 to 70° C., more preferably 15 to 60° C. and further preferably 20 to 50° C.

The refrigerant may contain an additive such as an antistatic agent, a disinfectant or a scale inhibitor. It is also preferable that when the refrigerant is used while circulating, chips generated in cutting of strands be removed by, for example, a filter.

Examples of step 2 include (i) immersing a strand-shaped resin in a refrigerant filled in a vessel and (ii) bringing a strand-shaped resin into contact with a refrigerant flowing on a slider. The method of above (ii) is preferred from the viewpoint of cooling efficiency and simplicity of apparatus.

More specifically, step 2 is preferably performed by a slider cooling system. The slider cooling system is a system of cooling in which a strand-shaped resin is allowed to flow on a slider on which a refrigerant flows to bring the resin into contact with the refrigerant.

The length of the slider is not particularly limited, and is preferably 1 to 10 m, more preferably 1.5 to 7.5 m, and further preferably 2 to 5 m from the viewpoint of sufficient cooling.

The contact time with a refrigerant, which is determined based on the take-off speed and the length of the slider, is preferably 0.1 to 6.7 seconds, more preferably 0.2 to 4.3 seconds, further preferably 0.4 to 3.3 seconds, and still more preferably 0.5 to 2.2 seconds.

The contact time with a refrigerant means the time from the contact with a refrigerant after being discharged from a reaction vessel in the form of a strand to immediately before being cut by a pelletizer.

Furthermore, the flow rate of a refrigerant flowing on the slider is preferably 1 to 100 times by volume, more preferably 3 to 48 times by volume, and further preferably 6 to 38 times by volume based on the strand-shaped resin.

[Step 3]

Step 3 is a step of cutting the cooled strand-shaped resin to obtain resin pellets. In step 3, the cooled strand-shaped resin is introduced to a pelletizer (cutter) at the take-off speed described above and cut. The strand-shaped resin may be cooled to the extent that the resin can be cut.

The length of resin pellets prepared by cutting is preferably 0.3 to 9 mm, more preferably 1.2 to 4.8 mm, and further preferably 2.2 to 3.8 mm.

It is preferable that the present invention comprise a step of drying resin pellets after step 3. It is also preferable that the present invention further comprise, thereafter, a step of removing defective pellets with, for example, a size sorting machine for resin pellets.

Hereinafter, the thermoplastic resin used in the present invention will be described.

<Thermoplastic Resin>

Examples of thermoplastic resins, which are not particularly limited, include vinyl polymers such as polyethylene, polypropylene, polystyrene, polyvinyl chloride, polyvinyl acetate, an acrylonitrile-butadiene-styrene resin (ABS) and an acrylonitrile-styrene resin (AS resin); acrylic polymers containing a constituent unit derived from (meth)acrylic acid and an ester thereof; polyurethane prepared by polyaddition of polyol and polyisocyanate; polycarbonate; polyacetal; polyester resins such as polyethylene terephthalate (PET) and polyethylene naphthalate; polyamide; and polyamide imide.

Among them, resins having a relatively low glass transition temperature, such as a polyester resin and a polyamide resin, may be suitably used in the present invention because strands are easily fused when brought into contact with each other and they have excellent rigidity and toughness and thus are likely to be affected by conditions when cutting strands.

In particular, polyamide containing a meta-xylylene group in the polymer main chain, such as meta-xylylene adipamide (polyamide prepared by polycondensation of meta-xylylene diamine and adipic acid), is a polymer having high elastic modulus and has high hardness when formed into a strand, and thus is relatively easily affected by change in conditions of the pelletization step, and therefore may be suitably used in the present invention.

[Polyamide Resin]

Hereinafter, a polyamide resin, which is suitably used as a thermoplastic resin in the present invention, will be described.

The polyamide resin is preferably a polyamide prepared by polycondensation of a diamine component and a dicarboxylic acid component. It is preferable that polyamide be prepared by a melt polycondensation method.

Suitable examples of melt polycondensation methods include a so-called direct polymerization method in which diamine is directly added to molten carboxylic acid to perform polycondensation. More specifically, while stirring dicarboxylic acid in a molten state in a reaction vessel, diamine is continuously or intermittently added thereto, and polycondensation is performed while removing condensed water, and during the addition of diamine, the reaction temperature is increased such that the temperature does not reach below the melting point of the polymer produced. It is preferable that the pressure of the reaction system be increased during the addition of diamine. Furthermore, reaction may be continued even after the completion of the addition of diamine while preferably continuing pressurization and controlling the temperature such that the temperature does not reach below the melting point of the polyamide to be produced. The above reaction, however, may be performed under normal pressure. Subsequently, the pressure may be gradually reduced to a pressure lower than normal pressure, and then the reaction may be further continued for a certain time. The upper limit of the reaction temperature in the present method for production is usually controlled to about the melting point of the resulting polyamide+30° C. or less.

Diamine and dicarboxylic acid used in the present method for production will be described later. The content (% by mole) for each type of the respective diamines (e.g., meta-xylylene diamine) in total diamines to be used is the same as the proportion (% by mole) of the respective constituent units for each type derived from the respective diamines based on the diamine units in polyamide described above. The same applies to dicarboxylic acid.

The melt polycondensation method is not limited to the direct polymerization method, and a nylon salt method in which a nylon salt composed of a dicarboxylic acid and a diamine is heated in the presence of water under pressure may be performed.

Furthermore, the polycondensation reaction may also be carried out by a reactive extrusion method in which an oligomer of polyamide composed of diamine and dicarboxylic acid is melt-kneaded and reacted in an extruder. It is preferable that in the reactive extrusion method, a screw suitable for reactive extrusion be used and a twin screw extruder with a relatively large L/D be used in order to carry out the reaction sufficiently.

Polyamide in a molten state obtained when the polycondensation is completed is discharged in the form of a strand through a die disposed, for example, at the bottom of a reaction vessel. The shape of the die at that stage will be described later. The temperature of polyamide at the time of a discharge of strands may be the melting point of polyamide or higher so as to keep polyamide in the molten state, and the temperature is preferably melting point or more and (melting point+30° C.) or less.

<<Dicarboxylic Acid Unit>>

It is preferable that the dicarboxylic acid units in polyamide suitable in the present invention contain 30% by mole or more of α,ω-aliphatic dicarboxylic acid having 4 to 20 carbon atoms. Examples of α,ω-aliphatic dicarboxylic acids having 4 to 20 carbon atoms include succinic acid, glutaric acid, adipic acid, pimelic acid, suberic acid, azelaic acid, sebacic acid, 1,9-nonanedicarboxylic acid (also called non-amethylenedicarboxylic acid) and 1,10-decanedicarboxylic acid (also called decamethylenedicarboxylic acid). Among them, adipic acid and sebacic acid are more preferred.

Examples of dicarboxylic acid units other than α,ω-aliphatic dicarboxylic acids having 4 to 20 carbon atoms include, but are not limited to, alicyclic dicarboxylic acids such as 1,3-cyclohexanedicarboxylic acid and 1,4-cyclohexanedicarboxylic acid; and aromatic dicarboxylic acids such as terephthalic acid, isophthalic acid, orthophthalic acid, xylylene dicarboxylic acid and naphthalene dicarboxylic acid.

<<Diamine Unit>>

The diamine component in polyamide is preferably a diamine component containing, in total, 70% by mole or more of a diamine selected from the group consisting of xylylenediamine and bis(aminomethyl)cyclohexane.

Xylylenediamine may be any of ortho-xylylenediamine, meta-xylylenediamine and para-xylylenediamine. A plurality of types of them may also be mixed and used. Meta-xylylenediamine, para-xylylenediamine or a mixture thereof is preferred; and meta-xylylenediamine alone or a mixture of meta-xylylenediamine and para-xylylenediamine is more preferred.

Furthermore, bis(aminomethyl)cyclohexane is preferably 1,3- or 1,4-bis(aminomethyl)cyclohexane. 1,3-bis(aminomethyl)cyclohexane and 1,4-bis(aminomethyl)cyclohexane include the cis-form and the trans-form. For 1,3-bis(aminomethyl)cyclohexane, the ratio of cis-form/trans-form is preferably 50/50 to 100/0, more preferably 55/45 to 100/0, and further preferably 65/35 to 100/0 from the viewpoint of heat resistance, and the like. For 1,4-bis(aminomethyl)cyclohexane, the ratio of cis-form/trans-form is preferably 60/40 to 0/100, more preferably 40/60 to 0/100, and further preferably 25/75 to 0/100.

For polyamide, examples of diamines other than xylylenediamine and bis(aminomethyl)cyclohexane include, but are not limited to, aliphatic diamines such as tetramethylenediamine, pentamethylenediamine, 2-methyl-1,5-pentanediamine, hexamethylenediamine, heptamethylenediamine, octamethylenediamine, nonamethylenediamine, decamethylenediamine, dodecamethylenediamine and 2,2,4- or 2,4,4-trimethylhexamethylenediamine; alicyclic diamines such as 1,3- or 1,4-diaminocyclohexane, bis(4-aminocyclohexyl) methane, 2,2-bis(4-aminocyclohexyl) propane, bis(aminomethyl)decalin and bis(aminomethyl)tricyclodecane; and diamines having an aromatic ring such as bis(4-aminophenyl)ether, paraphenylene diamine and bis(aminomethyl)naphthalene.

Among them, preferred examples of polyamide resins include (1) a polyamide resin prepared by melt polymerization of a dicarboxylic acid component containing, in total, 40% by mole or more, preferably 50% by mole or more of a dicarboxylic acid selected from the group consisting of adipic acid and sebacic acid and a diamine component containing 70% by mole or more of bis(aminomethyl)cyclohexane; (2) a polyamide resin prepared by melt polymerization of a dicarboxylic acid component containing, in total, 70% by mole or more of a dicarboxylic acid selected from the group consisting of adipic acid and sebacic acid and a diamine component containing, in total, 70% by mole or more of a diamine selected from the group consisting of meta-xylylenediamine and para-xylylenediamine; and (3) a polyamide resin prepared by melt polymerization of a dicarboxylic acid component containing, in total, 30% by mole or more of a dicarboxylic acid selected from the group consisting of adipic acid and sebacic acid and 1 to 70% by mole of isophthalic acid, and a diamine component containing, in total, 70% by mole or more of a diamine selected from the group consisting of meta-xylylenediamine and para-xylylenediamine.

The above melt polymerization is a polycondensation reaction. In this polymerization reaction, polycondensation of a dicarboxylic acid component and a diamine component may be performed in the presence of a phosphorus atom-containing compound. The presence of a phosphorus atom-containing compound described above can improve polymerization properties of polyamide and can prevent coloration of polyamide.

Examples of phosphorus atom-containing compounds include phosphinic acid compounds such as dimethylphosphinic acid and phenyl(methyl)phosphinic acid; hypophosphorous acid compounds such as hypophosphorous acid, sodium hypophosphite, potassium hypophosphite, lithium hypophosphite, magnesium hypophosphite, calcium hypophosphite and ethyl hypophosphite; phosphonic acid compounds such as phosphonic acid, sodium phosphonate, potassium phosphonate, lithium phosphonate, potassium phosphonate, magnesium phosphonate, calcium phosphonate, phenyl phosphonic acid, ethyl phosphonic acid, sodium phenylphosphonate, potassium phenylphosphonate, lithium phenylphosphonate, diethyl phenylphosphonate, sodium ethylphosphonate and potassium ethylphosphonate; phosphonous acid compounds such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite and ethyl phenylphosphonite; and phosphorous acid compounds such as phosphorous acid, sodium hydrogen phosphite, sodium phosphite, lithium phosphite, potassium phosphite, magnesium phosphite, calcium phosphite, triethyl phosphite, triphenyl phosphite and pyrophosphorous acid.

Among them, hypophosphorous acid metal salt such as sodium hypophosphite, calcium hypophosphite, potassium hypophosphite and lithium hypophosphite are particularly preferably used because they have a high effect of promoting polycondensation reaction and have excellent effect of preventing coloration. In particular, sodium hypophosphite is preferred. The phosphorus atom-containing compound which may be used in the present invention is not limited to these compounds.

The phosphorus atom-containing compound is preferably blended such that the concentration of phosphorus atoms in polyamide pellets is 1 to 1,500 ppm, more preferably 1 to 800 ppm, and further preferably 1 to 500 ppm. When the concentration is 1 ppm or more, polycondensation reaction proceeds at a moderate rate and coloration is unlikely to occur during the polycondensation reaction. When the concentration is 1,500 ppm or less, the resulting polyamide is unlikely to be gelled and mixing of fish eyes into formed articles, which may be caused by the phosphorus atom-containing compound, can be reduced, and thus the appearance of formed articles is improved.

Polymerization reaction may be performed in the presence of an alkali metal compound in addition to the phosphorus atom-containing compound. Blending of an alkali metal compound helps to adjust the rate of amidation reaction and can prevent gelation which may occur due to addition of the phosphorus atom-containing compound.

The alkali metal compound and the phosphorus atom-containing compound mentioned above are usually added to the reaction system before the dicarboxylic acid component and the diamine component are reacted.

Preferred examples of alkali metal compounds include alkali metal hydroxides, alkali metal acetates, alkali metal carbonates and alkali metal alkoxides. Specific examples of alkali metal compounds usable in the present invention include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide and sodium carbonate. The alkali metal compound is not limited to these compounds and other alkali metal compounds may be used. The ratio (molar ratio) of the phosphorus atom-containing compound to the alkali metal compound in polyamide pellets is preferably in the range of phosphorus atom-containing compound/alkali metal compound=1.0/0.05 to 1.0/1.5, more preferably 1.0/0.1 to 1.0/1.2, and further preferably 1.0/0.2 to 1.0/1.1 from the viewpoint of controlling the rate of polymerization and reducing yellowness.

Other additives such as a molecular weight modifier and other monomers described later may further be added to the reaction system in addition to diamine, dicarboxylic acid, a phosphorus atom-containing compound and an alkali metal compound.

The polyamide according to the present invention may contain a unit derived from other monomer components such as lactams including ε-caprolactam, ω-laurolactam and ω-enantholactam and amino acids including 6-aminocaproic acid, 7-aminoheptanoic acid, 11-aminoundecanoic acid, 12-aminododecanoic acid, 9-aminononanoic acid and para-amino methyl benzoate in addition to the diamine unit and the dicarboxylic acid unit, within the range that does not deteriorate properties. The diamine unit and the dicarboxylic acid unit, however, are the main components of polyamide, and although their total amount is not particularly limited, it is usually about 80% by mole or more, and preferably 90% by mole or more based on total constituent units.

The polyamide pellet according to the present invention may also contain other optional components in addition to polyamide within the range that does not deteriorate properties. Polyamide, however, is the main component of the pellet, and although the content is not particularly limited, it is usually about 80% by mass or more, and preferably 90% by mass or more based on total pellets.

Other optional components may be mixed as needed, and the resin pellets according to the present invention may be formed into a formed article having a desired shape by a known molding method such as injection molding, blow molding, extrusion, compression molding, stretching and vacuum forming. Examples of formed articles, which are not particularly limited, include various articles such as film, sheet, laminated film, laminated sheet, tube, hose, pipe, hollow containers, bottles, fiber and components of various shapes.

The resin pellets according to the present invention may also be subjected to solid phase polymerization to give high molecular weight crystallized pellets. The high molecular weight crystallized pellets may further be formed into various formed articles by the respective forming methods in the same manner as described above.

EXAMPLES

Hereinafter, the present invention will be described in more detail with reference to Examples and Comparative Examples, but the present invention is not limited to these Examples.
(Measurement of Melt Viscosity)

The melt viscosity of the resulting pellets was measured under the following condition.

The melt viscosity was measured by using Capillograph D-1 manufactured by Toyoseiki Seisaku-sho, Ltd. with a die: 1 mmϕ×10 mm long, under the condition of an apparent shear rate of 122 sec$^{-1}$, a measurement temperature of a temperature at which a resin is discharged, a preheating time of a resin of 6 minutes and a water content of a resin of 0.06% by mass or less.

Example 1

<Production of Polyamide>

Polyamide was synthesized as follows using a 500 liter stainless steel batch-wise reactor equipped with a partial condenser in which temperature-controlled oil flows, a total condenser, a tube for introducing nitrogen gas and a jacket which covers the entire surface of the reaction vessel and in which oil flows, and a tank and a pump for dropping diamine.

150.0 kg (1024.9 moles) of adipic acid (purity 99.85% by mass) was placed in the reactor and the air inside the reactor was sufficiently substituted with nitrogen. Then, adipic acid was heated to 190° C. with stirring at a pressure of 0.3 MPaG. After reaching the temperature, 138.8 kg (1018.8 moles) of meta-xylylenediamine (purity 99.99% by mass) was added dropwise thereto over 80 minutes while keeping the pressure inside the reactor at 0.3 MPaG. Heating was adjusted such that the temperature when the dropwise addition of diamine was completed was 240° C. The temperature of the vapor at the outlet of the partial condenser was controlled to 143 to 147° C., and the vapor distilled was condensed through the total condenser and discharged to the outside of the system. After the completion of the dropwise addition of diamine, the system was kept at a pressure of 0.3 MPaG for 20 minutes with stirring, and then the pressure was reduced to normal pressure at a rate of 0.01 MPa/minute over 30 minutes. The pressure was further reduced to 80 kPa and the system was kept for 20 minutes with stirring. The temperature of the reaction solution was increased to 256° C. in the period from the completion of the dropwise addition of diamine to the completion of the reduction of pressure.
<Production of Resin Pellets>
[Step 1]

After the completion of the reaction, stirring was stopped and the inside of the reactor was pressurized with nitrogen to 0.37 MPaG to discharge the molten polymer from a strand die having an effective die plate width of 27.55 cm and a die hole diameter of 0.74 cm through a die valve at the bottom of the reactor at 256° C. at a flow rate of 21.63 cm$^3$/s per die hole in 20 strands. The melt viscosity of the strands was 246 Pa·s under a condition of a shear rate of 122 sec$^{-1}$.
[Step 2]

The strands discharged were cooled in a cooling tank with a 2.3 m water slider, in which cooling water at 30° C. flowed at 30 m$^3$/h, and at the same time were taken off, cut and pelletized with a pelletizer. The strand diameter was 0.29 cm and the strand interval was 1.16 cm at that stage. The take-off speed of the cutter of the pelletizer was 3.3 m/s. The contact time with the cooling water was 0.7 second at that stage.
[Step 3]

The strands cooled were cut with a rotary cutter to give the resulting pellets having a length of 3.0 mm, a major axis of 3.1 mm and a minor axis of 2.6 mm.

Defective pellets of the resulting resin pellets were sorted into double pellets and other defective pellets. In the method of sorting, about 100 g of the pellets obtained was sampled, and double pellets and other defective pellets were sorted by visual observation, and their mass was measured. Other defective pellets means the total of triple or more pellets and deformed pellets. The ratio of defect is the mass of double or other defective pellets divided by the total amount of the pellets sampled.

The results are shown in the following Table 2.

Examples 2 and 3 and Comparative Examples 1 to 3

Resin pellets were produced in the same manner as in Example 1 except for changing the die used and condition of production as follows. The results of evaluation of double pellets and other defective pellets are shown in the following Table 2.

The die plate and the polymer used, conditions of pelletizing and the pellets prepared in Examples 1 to 3 and Comparative Examples 1 to 3 are shown in the following Table 1(a) to Table 1(d).

TABLE 1(a)

| Die plate | Number of die hole Hole | Diameter of die hole cm | Effective die plate width cm |
|---|---|---|---|
| Example 1 | 20 | 0.74 | 27.55 |
| Example 2 | 20 | 0.74 | 27.55 |
| Example 3 | 30 | 0.68 | 27.97 |
| Comparative Example 1 | 32 | 0.75 | 27.90 |
| Comparative Example 2 | 32 | 0.75 | 27.90 |
| Comparative Example 3 | 45 | 0.68 | 27.97 |

TABLE 1(b)

| Polymer | Flow rate of polymer cm$^3$/sec/hole | Temperature ° C. | Melt viscosity Pa · s | Strand diameter cm | Strand interval cm |
|---|---|---|---|---|---|
| Example 1 | 21.63 | 256 | 246 | 0.29 | 1.16 |
| Example 2 | 7.01 | 256 | 246 | 0.24 | 1.21 |
| Example 3 | 4.36 | 256 | 246 | 0.16 | 0.81 |
| Comparative Example 1 | 13.82 | 256 | 251 | 0.25 | 0.65 |
| Comparative Example 2 | 24.53 | 256 | 251 | 0.33 | 0.57 |
| Comparative Example 3 | 9.59 | 256 | 251 | 0.30 | 0.34 |

TABLE 1(c)

| Pelletizing condition | Pressure of extrusion MPa | Temperature of water °C. | Flow rate m³/h | Length of slider m | Take-off speed m/sec |
|---|---|---|---|---|---|
| Example 1 | 0.37 | 30 | 30 | 2.3 | 3.3 |
| Example 2 | 0.22 | 30 | 30 | 2.3 | 1.5 |
| Example 3 | 0.14 | 30 | 30 | 2.3 | 2.3 |
| Comparative Example 1 | 0.27 | 30 | 30 | 2.3 | 2.8 |
| Comparative Example 2 | 0.40 | 30 | 30 | 2.3 | 2.8 |
| Comparative Example 3 | 0.27 | 30 | 30 | 2.3 | 1.4 |

TABLE 1(d)

| Pellet | Length mm | Major axis mm | Minor axis mm | Average mm |
|---|---|---|---|---|
| Example 1 | 3.0 | 3.1 | 2.6 | 2.8 |
| Example 2 | 3.1 | 2.7 | 2.2 | 2.4 |
| Example 3 | 3.0 | 1.7 | 1.4 | 1.6 |
| Comparative Example 1 | 3.2 | 2.8 | 2.2 | 2.5 |
| Comparative Example 2 | 3.0 | 3.6 | 3.1 | 3.4 |
| Comparative Example 3 | 3.1 | 3.2 | 2.7 | 3.0 |

TABLE 2

|  | Good product | Double pellet | Other defective pellet |
|---|---|---|---|
| Example 1 | 95.1% | 4.4% | 0.5% |
| Example 2 | 95.4% | 4.2% | 0.4% |
| Example 3 | 91.0% | 7.6% | 1.4% |
| Comparative Example 1 | 87.3% | 10.4% | 2.3% |
| Comparative Example 2 | 84.8% | 12.2% | 3.0% |
| Comparative Example 3 | 72.6% | 20.1% | 7.3% |

In Example 1, which satisfies Formula 1, the occurrence of double pellets was suppressed to 4.4%, and the occurrence of total defective pellets (the total of double pellets and other defective pellets) was also suppressed to 4.9%. Furthermore, in Example 2, the occurrence of double pellets was suppressed to 4.2%, and the occurrence of total defective pellets (the total of double pellets and other defective pellets) was also suppressed to 4.6%. Moreover, in Example 3, the occurrence of double pellets was suppressed to 7.6%, and the probability of all defective pellets was 9.0%.

On the other hand, in Comparative Example 1, which does not satisfy Formula 1, the occurrence of double pellets was 10.4%, and the occurrence of total defective pellets was 12.7%. Likewise, in Comparative Example 2, which does not satisfy Formula 1, the occurrence of double pellets was 12.2%, and the occurrence of total defective pellets was 15.2%. Furthermore, in Comparative Example 3, the occurrence of double pellets was 20.1%, and the occurrence of total defective pellets was 27.4%.

Here, strand interval X in Example 1 was 1.16 cm. As shown in the following Table 3, the probability of double pellets determined from a normal distribution table well corresponded with the measured value. The probability of double pellets determined from the normal distribution table well corresponded with the measured value also in Examples 2 and 3. Furthermore, strand interval X in Comparative Example 1 was 0.65 cm. The probability of double pellets determined from the normal distribution table well corresponded with the measured value even in Comparative Example 1. The probability of double pellets determined from the normal distribution table well corresponded with the measured value also in Comparative Examples 2 and 3.

TABLE 3

|  | X (cm) | b | $X^b$ | a | $X^b/a$ | Probability determined from normal distribution table (%) | Measured value (%) |
|---|---|---|---|---|---|---|---|
| Example 1 | 1.16 | 0.367 | 1.056 | 0.524 | 2.015 | 4.39 | 4.4 |
| Example 2 | 1.21 | 0.367 | 1.071 | 0.524 | 2.044 | 4.09 | 4.2 |
| Example 3 | 0.81 | 0.367 | 0.926 | 0.524 | 1.766 | 7.73 | 7.6 |
| Comparative Example 1 | 0.65 | 0.367 | 0.854 | 0.524 | 1.629 | 10.32 | 10.4 |
| Comparative Example 2 | 0.57 | 0.367 | 0.811 | 0.524 | 1.549 | 12.15 | 12.2 |
| Comparative Example 3 | 0.34 | 0.367 | 0.672 | 0.524 | 1.283 | 19.96 | 20.1 |

INDUSTRIAL APPLICABILITY

According to the method for producing resin pellets of the present invention, occurrence of defective pellets including double pellets is suppressed, and thus resin pellets can be produced at good yield. Furthermore, the probability of double pellets can be predicted, and thus the strand interval can be selected depending on the acceptable probability of double pellets.

REFERENCE SIGNS LIST

10 Die plate
12 Die hole
Dh Hole diameter
St Strand diameter
$D_{max}$ Effective die plate width

The invention claimed is:
1. A method for producing resin pellets, comprising the following step 1 to step 3:
Step 1: discharging a molten thermoplastic resin through a die in a form of a strand to obtain a discharged strand-shaped resin;
Step 2: cooling the discharged strand-shaped resin using a refrigerant to obtain a cooled strand-shaped resin; and
Step 3: cutting the cooled strand-shaped resin to obtain resin pellets,
wherein the discharged strand-shaped resin has a diameter of 1.5 to 4.5 mm, the molten thermoplastic resin is discharged in the form of the strand at a take-off speed of 1.5 m/s to 10 m/s, the die has 10 or more die holes, and a strand interval X defined by the following Formula 2 satisfies the following Formula 1:

$$1.73 \times a \leq X^b \leq 2.81 \times a \quad \text{Formula 1}$$

wherein a, b and X are as defined below:

$$a = 0.524$$

$$b = 0.367$$

$$X(\text{cm}) = \{(\text{effective die plate width})(\text{cm}) - (\text{strand diameter})(\text{cm}) \times (\text{number of strands} - 1)\} / \{(\text{number of strands}) - 1\} \quad \text{Formula 2}$$

wherein the effective die plate width is a maximum distance between an outerside hole center of one die hole positioned at one end of the die and an outerside hole center of another die hole positioned at an opposite end of the die, and wherein occurrence of defective pellets is suppressed by setting the strand interval according to Formula (2) which satisfies Formula (1) while using the take-off speed of 1.5 m/s to 10 m/s.

2. The method for producing resin pellets according to claim 1, wherein the thermoplastic resin is a polyamide resin.

3. The method for producing resin pellets according to claim 1, wherein the die hole has a hole diameter of 0.2 to 1.5 cm.

4. The method for producing resin pellets according to claim 1, wherein the thermoplastic resin has a melt viscosity of 50 to 3,000 Pas under a condition of a shear rate of 122 $sec^{-1}$ at a temperature of the resin during the discharge in the step 1.

5. The method for producing resin pellets according to claim 1, wherein the step 2 is performed by a slider cooling system.

6. The method for producing resin pellets according to claim 1, wherein a temperature of the refrigerant is 10 to 70° C. in the step 2.

7. The method for producing resin pellets according to claim 1, wherein the refrigerant in the step 2 is water.

8. The method for producing resin pellets according to claim 1, wherein a contact time of the strand-shaped resin with the refrigerant is 0.1 to 6.7 seconds.

9. The method for producing resin pellets according to claim 1, wherein the thermoplastic resin is a polyamide resin obtained by melt polymerization of a dicarboxylic acid component comprising 30% by mole or more of am-aliphatic dicarboxylic acid having 4 to 20 carbon atoms and a diamine component comprising, in total, 70% by mole or more of a diamine selected from the group consisting of xylylenediamine and bis(aminomethyl)cyclohexane.

10. The method for producing resin pellets according to claim 1, wherein the step 1 is a step of discharging the thermoplastic resin from a reaction vessel under pressure and the pressure is 0.1 to 1 MPaG.

\* \* \* \* \*

UNITED STATES PATENT AND TRADEMARK OFFICE
CERTIFICATE OF CORRECTION

PATENT NO. : 11,110,629 B2
APPLICATION NO. : 16/603776
DATED : September 7, 2021
INVENTOR(S) : Shinohara et al.

It is certified that error appears in the above-identified patent and that said Letters Patent is hereby corrected as shown below:

On the Title Page

Column 2, the Primary Examiner, please delete "Seyed Masoud Melekzadeh" and insert -- Seyed Masoud Malekzadeh --, therefor.

In the Claims

Column 17, Line (18):
In Claim 4, please delete "Pas" and insert -- Pa · s --, therefor.

Column 18, Lines (13-14):
In Claim 9, please delete "am-aliphatic" and insert -- α,ω-aliphatic --, therefor.

Signed and Sealed this
Tenth Day of May, 2022

Katherine Kelly Vidal
*Director of the United States Patent and Trademark Office*